United States Patent [19]

Tateishi

[11] Patent Number: 4,786,849

[45] Date of Patent: Nov. 22, 1988

[54] OFFSET COMPENSATING CIRCUIT IN FINE CONTROL SERVO DEVICE

[75] Inventor: Kiyoshi Tateishi, Saitama, Japan

[73] Assignee: Pioneer Electronic Corporation, Tokyo, Japan

[21] Appl. No.: 99,261

[22] Filed: Sep. 21, 1987

[30] Foreign Application Priority Data

Sep. 19, 1986 [JP] Japan .................................. 61-221679

[51] Int. Cl.$^4$ .......................................... G05D 13/275
[52] U.S. Cl. ..................................... 318/632; 318/616; 318/624; 318/592
[58] Field of Search ............... 318/632, 608, 599, 624, 318/616, 684, 592

[56] References Cited

U.S. PATENT DOCUMENTS

| 4,109,189 | 8/1978 | Jacques et al. | 318/632 |
| 4,112,342 | 9/1978 | Elliott | 318/599 |
| 4,156,169 | 5/1979 | Imamura | 318/616 |
| 4,539,608 | 9/1985 | Hill et al. | 318/694 X |

*Primary Examiner*—Benjamin Dobeck
*Attorney, Agent, or Firm*—Sughrue, Mion, Zinn, Macpeak, and Seas

[57] ABSTRACT

An offset compensating circuit in a fine control servo. When the servo loop for an error signal is opened, the error signal is sampled and its positive and negative peaks are found. The average of the positive and negative peaks is determined as an offset signal to be subtracted from the error signal when the loop is closed.

3 Claims, 2 Drawing Sheets

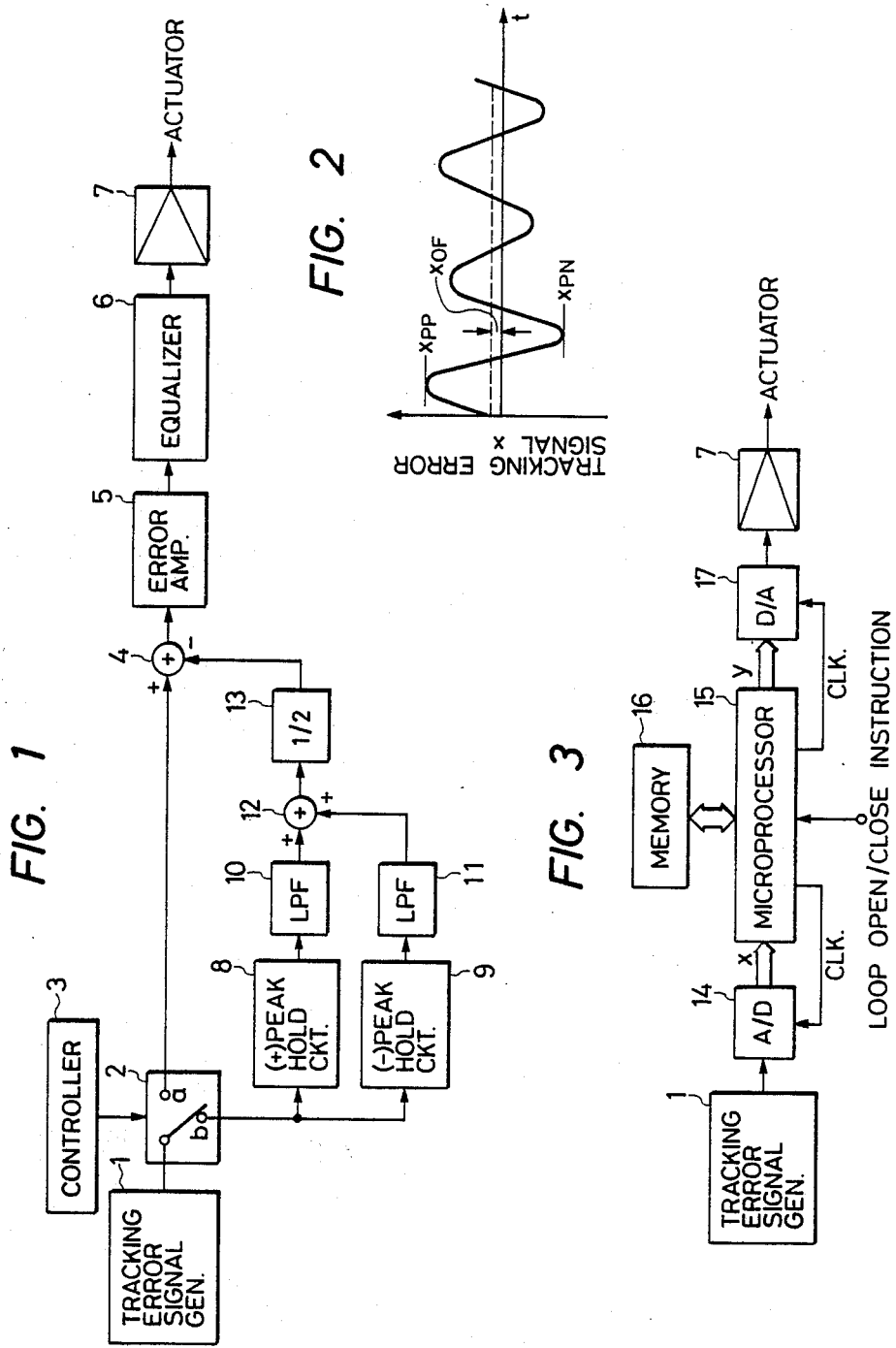

OFFSET COMPENSATING CIRCUIT IN FINE CONTROL SERVO DEVICE

BACKGROUND OF THE INVENTION

Field of the Invention

This invention relates to an offset compensating circuit in a fine control servo device such as a tracking servo device or a focus servo device.

BACKGROUND OF THE INVENTION

An optical player or the like is adapted to reproduce data recorded on a data recording disk (hereinafter referred to merely as "a disk") such as a video disk or a digital audio disk. It is essential for such a disk to have a tracking servo device for allowing a data detecting point to accurately follow the recording track of the disk or a focus servo device for focusing a laser beam, as a data detecting point, on the recording surface of the disk with high accuracy. These servo devices are classified into fine control servo devices and coarse control servo devices which greatly displace a movable object to be controlled. A fine control servo device comprises an objective lens or a pickup including an objective lens, so that the deflection of a movable object from a target can be finely controlled. On the other hand a coarse control servo device, such as a slider servo, greatly displaces the movable object.

In the fine control servo device, sometimes the error signal involves a DC offset because of fluctuations of the power of a light source such as a laser diode and of the reflection factor of a disk and variations in characteristics of an error signal detecting system and an error signal amplifying system. This offset will result in a steady-state error, and the servo operation is thus unstable.

SUMMARY OF THE INVENTION

In view of the foregoing, an object of this invention is to provide an offset compensating circuit for a fine control device, in which an offset in the servo system is compensated to permit a stable servo operation.

In the offset compensating circuit according to the invention, the positive and negative peak values Pp and PN of an error signal provided with a predetermined loop kept opened are detected, and are inserted in an expression (Pp+PN)/2 to calculate an offset value. An offset compensating operation is achieved by subtracting the offset value from the error signal.

BRIEF DESCRIPTION OF THE DRAWINGS

FIG. 1 is a block diagram showing one embodiment of this invention applied to a tracking servo device.

FIG. 2 is waveform diagram showing the waveform of a tracking error signal with a servo loop kept open.

FIG. 3 is a block diagram showing another embodiment of the invention.

DETAILED DESCRIPTION OF THE PREFERRED EMBODIMENTS

Figure 4:
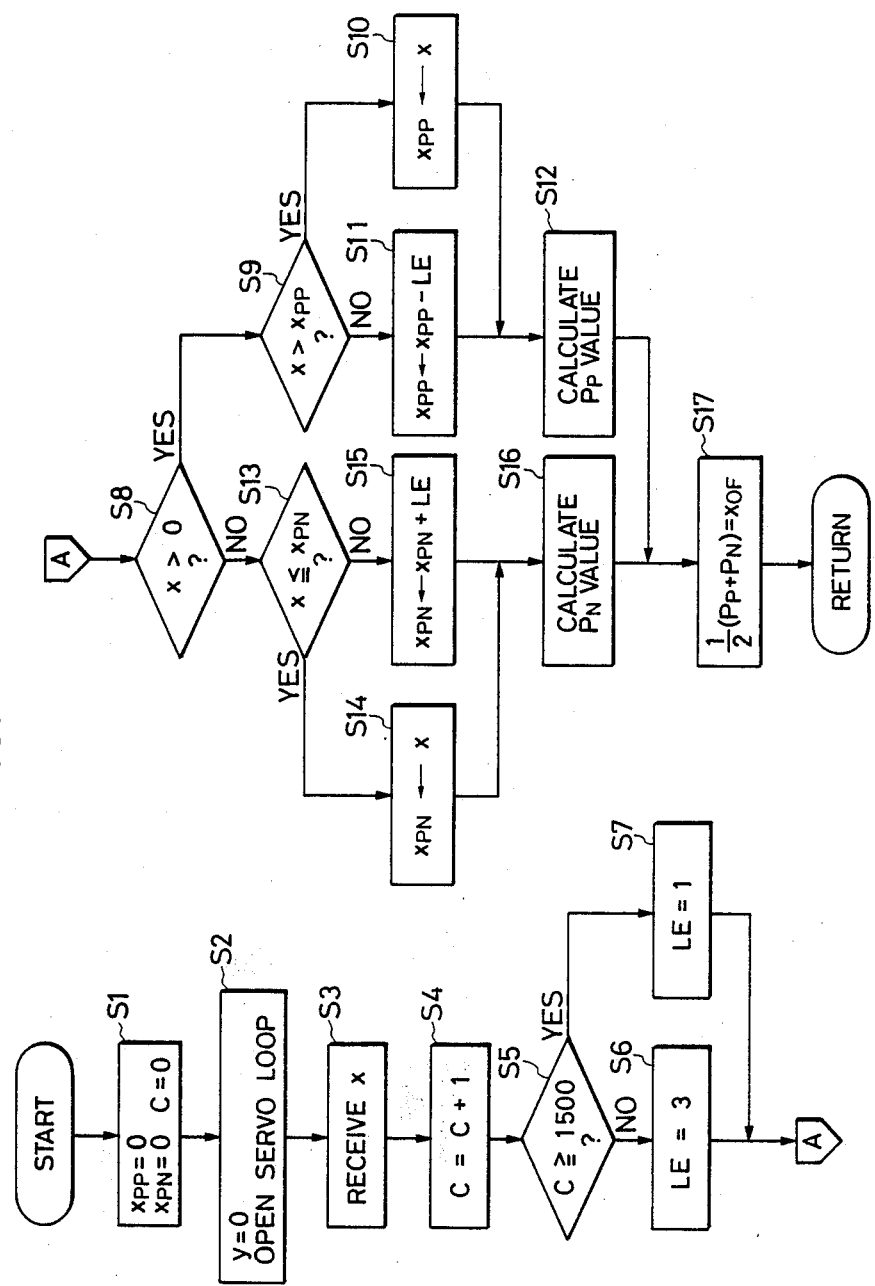
FIG. 4 is a flow chart showing a procedure of calculating an offset value by a microprocessor.

Preferred embodiments of this invention will be described with reference to the accompanying drawings.

FIG. 1 is a block diagram showing a first embodiment of the invention which is applied to a tracking servo device. In FIG. 1, a tracking error signal forming circuit 1 outputs a tracking error signal according to a light beam which is emitted from pickup (not shown) and for instance reflected from the recording surface of a disk. The tracking error signal is formed according to a so-called "three-beam method" in which three beams, namely, a data detecting main beam and sub beams arranged on both sides of the main beam are provided in such a manner that a line connecting the centers of these beams forms an offset angle with the track direction. An error signal is obtained according to the difference in the quantity of light between the sub beams reflected from the recording surface of the disk. Since the method of forming an error signal in the three-beam method is well known in the art, its specific description will be omitted.

The tracking error signal formed by the tracking error signal forming circuit 2 is supplied to a loop switch 2. The tripping of the loop switch 2 is controlled by a controller 3. When the switch 2 is at a contact a, a closed loop state is obtained. When it is at a contact b, an open loop state is obtained. When the servo loop is closed, the tracking error signal is supplied as a positive (+) input to a subtracter 4. The subtraction output of the subtracter 4 is supplied through an error amplifier 5, an equalizer circuit 6 and a drive amplifier 7 to a tracking actuator (not shown). The tracking actuator is built in the pickup to deflect the data detecting light spot (data detecting point) of the pickup in a direction perpendicular to a recording track (i.e., in a radial direction of the disk).

Thus, a tracking servo loop has been completed. Therefore, driving the tracking actuator according to the signal level of the tracking error signal formed by the tracking error signal forming circuit 1 can cause the data detecting light spot to accurately follow the recording track of the disk at all times.

At the time of set up mode or searching of a disk, the controller 3 operates to trip the armature of the loop switch 2 over to the contact b so that the servo loop is kept open for a predetermined period of time. When the servo loop is open, the tracking error signal changes as shown in FIG. 2. The tracking error signal is supplied to a positive peak hold circuit 8, where its positive peak value $x_{pp}$ is held, and it is further supplied to a negative peak hold circuit 9, where its negative peak value $X_{pn}$ is held. The peak hold outputs Pp and PN of the peak hold circuits 8 and 9 are supplied respectively through LPFs (low-pass filters) 10 and 11 to an adder 12, where they are added to each other. The output (Pp+PN) of the adder 12 is applied to a multiplier 13, where it is multiplied by a factor of $\frac{1}{2}$. The result of this multiplication, i.e., (Pp+PN)/2 is an offset value OF equal to the average of the positive and negative peaks $X_{pp}$ and $X_{pn}$. The offset value OF is applied, as a negative (−) input, to the subtracter 4. In the loop closed state, the offset value is subtracted from the signal level of the tracking error signal applied, as a positive (+) input, to the subtracter 4, thus performing the offset compensation.

Thus, the tracking error signal the DC offset of which has been cancelled out is provided at the output terminal of the adder 4. Therefore, the tracking operation is maintained stable independently of fluctuations of the power of the light source such as a laser diode, and of the reflection factor of the disk, and variations in characteristic of the error signal detecting system and of the error signal amplifying system.

When the servo loop is open, the tracking error signal is frequency-modulated because of the eccentricity of the disk. If, in this case, the speed of a spindle motor rotating the disk is smaller than a certain value, then it takes a relatively long period of time to hold the peak values of the error signals because the modulating frequency is low. In the case where a noise eliminating LPF is provided on the tracking signal input side, the tracking signal is frequency-modulated because of the eccentricity of the disk and it is varied in amplitude by the LPF. Therefore, if, in each of the positive and negative peak hold circuits 8 and 9, the peak values are held over several eccentric revolutions of the disk, and averaged, then the peak holding operation can be achieved with high accuracy. In other words, if the speed of the spindle motor is higher than the certain value, then when the peak hold time is set to a predetermined value, the number of peak values due to the eccentricity of the disk becomes higher than a certain value, so that the peak holding operation can be carried out with high accuracy.

In the above-described embodiment, the tracking error signal offset compensation is performed with hardware. The same effect, however, can be obtained using software including a microprocessor as shown in FIG. 3.

In FIG. 3, circuit elements corresponding functionally to those which have been described with reference to FIG. 1 are therefore designated by the same reference numerals or characters. The tracking error signal outputted by the circuit 1 is supplied to an A/D (analog-to digital) converter 14, where it is converted into a digital signal. The digital signal is applied to a microprocessor 15. The microprocessor 15 operates as follows. The microprocessor 15 places the loop in open state in response to a loop open instruction, and under this condition, holds the positive and negative peak values Pp and PN of the tracking error signal in a memory 16. Furthermore, the microprocessor 15 calculates an offset value XOF by inserting these values Pp and PN thus held into the expression (Pp+PN)/2 and stores the offset value XOF in the memory 16. In response to a loop close instruction, the microprocessor operates to subtract the offset value XOF from the signal level of the tracking error signal X to perform an offset compensating operation, and to subject the tracking error signal thus compensated to equalizing as required. A tracking error signal y provided by the microprocessor 15 is applied to a D/A (digital-to-analog) converter 17, where it is converted into an analog signal. The analog signal is supplied through the drive amplifier 7 to the actuator.

A procedure of calculating the offset value $X_{OF}$ by the microprocessor 15 will be described with reference to a flow chart of FIG. 4. In this connection, it is assumed that the calculation is carried out during a predetermined period of time, for instance 150 msec, after the speed of rotation of the spindle motor has reached a predetermined value with the focus servo locked and that the sampling frequency is set to 30 kHz.

First, an initial setting operation in step S1 resets detected peak values $X_{pp}$ and $X_{pN}$, and a count value C of a counter which increases its count value in synchronization with the sampling period. Then, the value y of the tracking error signal outputted by the microprocessor 15 is set to zero (0) and the servo loop is opened in step S2. Thereafter, the tracking error signal x is received in step S3. Under this condition, the count value C is increased by one (1) in step S4, and it is determined whether or not the resultant count value C is larger than, for instance 1500 in step S5. If C<1500, then for instance "3" is set as a constant LE in step S6; and, if C=1500, then for instance "1" is set in step S7.

The constant LE is used to compensate for noise in the peak holding operation and acts as follows. Of the sample and hold period (150 msec), for instance for the first 50 msec, the detected peak values $X_{pp}$ and $X_{pn}$ are allowed to satisfactorily follow the variation in the peak of the error signal with LE=3. Thereafter, with LE set to 1, the leakage of the peak is minimized. The reference count value 1500 is determined by the 50 msec initial period and the sampling frequency of 30 kHz. That is, the constant LE is employed for an improvement of the holding characteristic.

In step S8, it is determined whether or not the tracking error signal x is positive. When x>0, it is determined in step S9 whether or not the error signal x is larger than a previously detected peak value $X_{pp}$. When $X > X_{pp}$, the error signal x received currently is set as a detected peak value $X_{pp}$ in step S10. When $X \leq X_{pp}$, a value obtained by subtracting the constant LE from a previously detected peak value $X_{pp}$ is set as a detected peak value $X_{pp}$ in step S11. A filtered positive peak value Pp equivalent to that passed through the LPF 10 in FIG. 1 is calculated in step S12 from the thus set detected peak value $X_{pp}$.

When $x \leq 0$, it is determined in step S8, whether or not the error signal x is smaller than a previously detected peak value $X_{pn}$. When $X \leq X_{pn}$, an error signal X received currently is set in step S14 as a detected peak value $X_{pn}$. When $X > X_{pn}$, a value obtained by adding the constant LE to a previously detected peak value $X_{pn}$ is set in step S15 as a detected peak value $X_{pn}$. Under this condition, a filtered negative peak value PN (passed through the LPF 11 in FIG. 1) is calculated in step S16 from the thus set detected peak value $X_{pn}$. An offset value $X_{OF}$ is obtained in step S17 by inserting the positive and negative peak values Pp and PN thus calculated in the expression (Pp+PN)/2.

While the preferred embodiment of the invention has been described with reference to the tracking servo device, it should be noted that the technical concept of the invention is applicable to a focus servo device. In the latter case, a ramp signal is applied to a focus actuator with the servo loop kept open, to gradually move an objective lens in a direction perpendicular to the recording surface of a disk, thereby to obtain a focus error signal having a so-called "S-shaped curve characteristic". The positive and negative peak values of the focus error signal thus obtained are held, so that an offset value is calculated according to the abovedescribed expression.

As was described above, in the invention, with the servo loop kept open the positive and negative peak values of the error signal are detected, and the offset of the tracking error signal is canceled by subtracting the offset value calculated using these peak values from the signal level of the error signal. Therefore, the servo operation is made stable independently of fluctuations of the power of the light source such as a laser diode and of the reflection factor of the disk, and variations in the characteristics of the error signal detecting system and the error signal amplifying system.

What is claimed is:

1. An offset compensating circuit in a servo device, comprising:
    a servo loop including a source of an error signal and means for processing said error signal;

means for opening said servo loop;

peak detecting means for detecting positive and negative peak values $p_p$ and $p_n$ of said error signal with said servo loop kept open;

means for calculating an offset value by inserting said peak values $p_p$ and $p_n$ in the following expression:

$(p_p + p_n)/2$; and means for subtracting said offset value from a signal level of said error signal only when said servo loop is closed.

2. A circuit as claimed in claim 1, wherein said peak detecting means detects a plurality of positive and negative peak values and averages said plurality of positive and negative peak values thus detected to provide said peak values $P_p$ and $P_N$.

3. A circuit as claimed in claim 2, wherein said peak detecting means averages said positive and negative peak values only after a lapse of a predetermined period after said servo loop is opened.

* * * * *